W. L. DUNBAR.
LAST GAGE.
APPLICATION FILED FEB. 24, 1914.
1,206,313.
Patented Nov. 28, 1916.
2 SHEETS—SHEET 1.
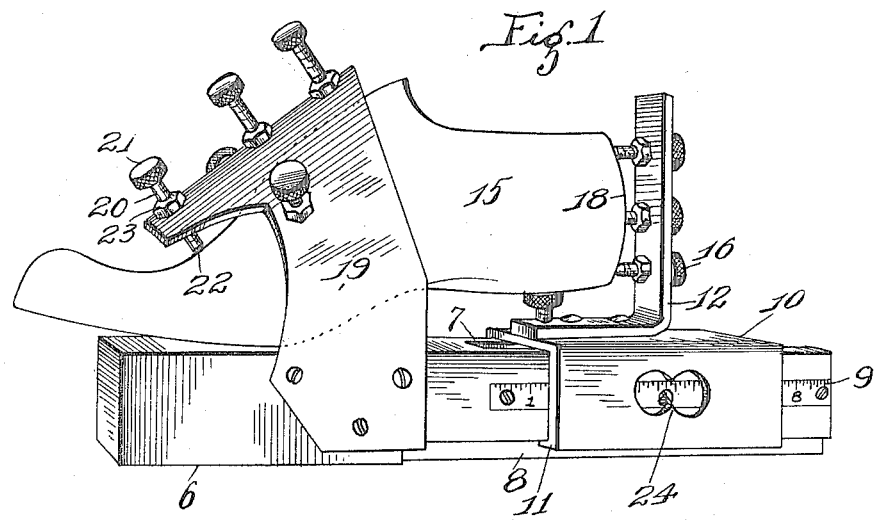
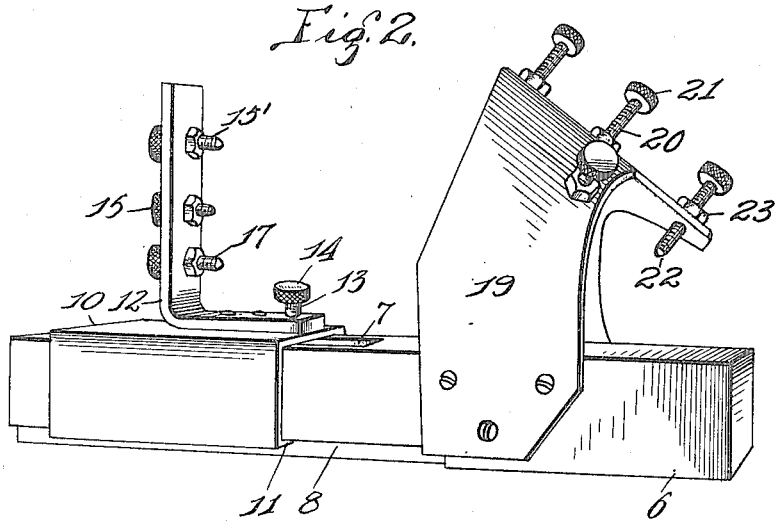
WITNESSES:
INVENTOR.
Willard L. Dunbar
BY
ATTORNEY.

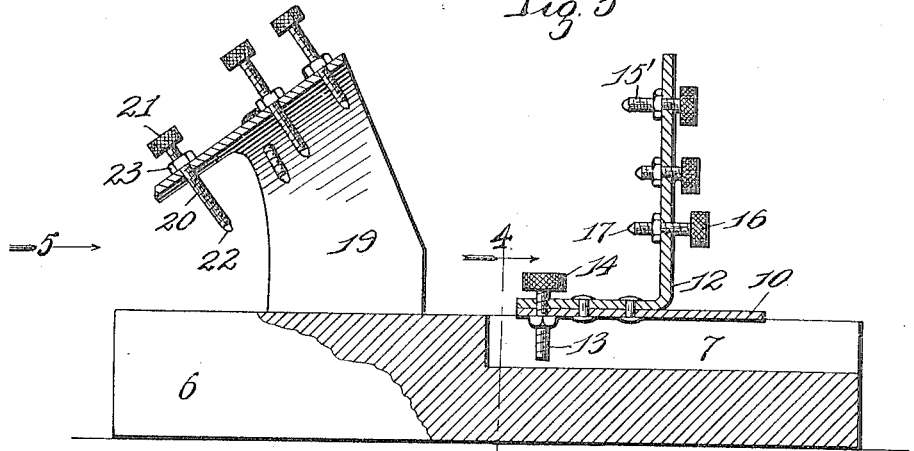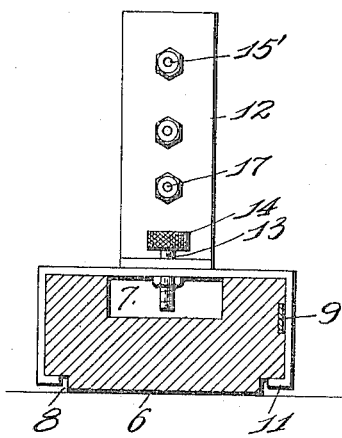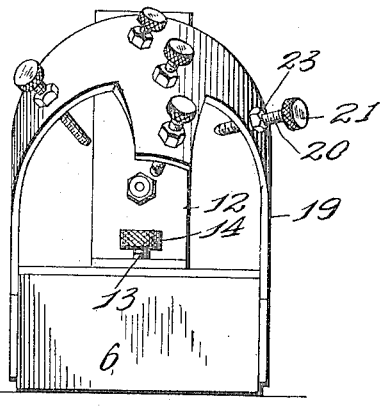

UNITED STATES PATENT OFFICE.

WILLARD L. DUNBAR, OF ST. LOUIS, MISSOURI, ASSIGNOR TO DUNBAR PATTERN COMPANY, OF BROCKTON, MASSACHUSETTS.

LAST-GAGE.

1,206,313.   Specification of Letters Patent.   Patented Nov. 28, 1916.

Application filed February 24, 1914. Serial No. 820,494.

*To all whom it may concern:*

Be it known that I, WILLARD L. DUNBAR, a citizen of the United States, and resident of St. Louis, Missouri, have invented certain new and useful Improvements in Last-Gages, of which the following is a specification.

This invention relates to improvements in a last gage, and has for its object an apparatus arranged for testing out the absolute outer contour of a shoe last so that the various lasts manufactured can be placed in the apparatus and tested to see that each last is properly shaped to conform with a certain pattern.

A further object of my invention is to construct an apparatus which is adjustable to fit any particular kind of last, size or shape, and the device is particularly adapted to test out a last to see whether or not a certain last will suffice for a particular pattern, that is, whether it will touch all of the contact points of the apparatus, and also have the required length to register with the gage on the side of the apparatus.

Figure 1, is a perspective view of my complete invention showing a last in position. Fig. 2, is a perspective view of my invention in a reversed position. Fig. 3, is a vertical central sectional view of my invention. Fig. 4, is a cross-sectional view taken on the line 4—4 of Fig. 3, and viewing the same in the direction indicated by the arrow. Fig. 5, is an end view looking in the direction indicated by the arrow 5.

In the construction of my invention I provide a base 6, which is preferably rectangular in form, the same having an elongated recess 7, formed in a portion thereof, and a portion of the under edges is cut away forming recesses or guide walls as indicated by the numeral 8. On one side of the body portion 6, is located a gage 9, this gage is graduated in inches and fractions thereof and is held thereon in any suitable manner. Over a portion of the base 6, is located a sliding member 10, which consists preferably of a bent sheet of material or casting having its two ends bent under forming flanges 11, which operate in the recesses or guide walls 8. On this sliding member is firmly secured a bracket 12, which is bent preferably at right angles the horizontal portion being firmly secured to the sliding member and provided with an adjustable screw 13, having a knurled head 14. This screw projects into the elongated recess 7, formed in the body portion or base and by means of this screw the head 14 may be adjusted to suit the elevated position due to the height of the heel of the finished shoe of the last 15 which is placed in the device and its position is adjusted by the operation of said screw, its lock nut being first placed at its lowest position on the screw, the screw adjusted, and by removing the member 10 the nut is then tightened locking the screw in its said position. In the vertical portion of the bracket 12, is located a plurality of adjusting screws 15′ each of which being provided with a knurled head 16, by which it is adjusted in order to bring its contact point 17, in relative position with the rear or heel portion 18, of the last. On the fore part of the base or body portion 6, is also firmly secured a yoke 19, held in place by screws or the like, and on this yoke is provided a plurality of adjusting screws 20, which are equipped with knurled heads 21, by which the contact points 22, of said screws may be brought in contact with the curvature of the instep and fore part of the last as shown, and each of said screws described are equipped with a lock nut 23, by which each one of said screws are firmly locked when in proper adjusted position. By this arrangement a last is properly gaged and a particular feature of the invention is to construct a gage by which lasts manufactured for the shoe trade are properly gaged so as to designate the proper curvature on all lasts of the same style and size. For example, in making a number of lasts for a particular style of shoe, the last after being properly turned by the manufacturer must necessarily be gaged to see that the curvature of the last is uniform. The gage is set in accordance with one particular last which is designed for a particular size and shape of a shoe. After the several screws have been adjusted to touch and register with the outer surface of the last, the point 24, on the side of the sliding member is observed to register with a particular point on the gage. The last is removed by moving the sliding member rearwardly and a new last inserted in position. If the several points of the screws contact properly with the last and the point 24, registers properly with the proper graduation on the gage then the last is in proper formation and can be used for that particular style of shoe; but should any one of the points be out of register that particular last is cast aside.

The device is simple in construction but has utility and merit and is very essential to the shoe trade.

Having fully described my invention what I claim is:

A last gage comprising an elongated rectangular base provided with an elongated recess located in a portion of the top of said base, a yoke mounted on the front of the base and firmly secured to the sides thereof, said base having recesses formed near the bottom thereof; a slidable member located on the base, its ends projecting into the last named recesses; an adjustable screw located on the member and projecting into the first named recess and a plurality of adjustable screws located on the yoke and also on the slidable member, substantially as specified.

In testimony whereof, I have signed my name to this specification, in presence of two subscribing witnesses.

WILLARD L. DUNBAR.

Witnesses:
ALFRED A. EICKS,
WALTER C. STEIN.

Copies of this patent may be obtained for five cents each, by addressing the "Commissioner of Patents, Washington, D. C."